May 7, 1968  C. W. POWELL  3,382,134

SIMULATED VENETIAN GLASS AND METHOD OF MAKING THE SAME

Filed July 20, 1964  3 Sheets-Sheet 1

INVENTOR.
CHARLES W. POWELL
BY
Aventer & Rothelin

ATTORNEYS

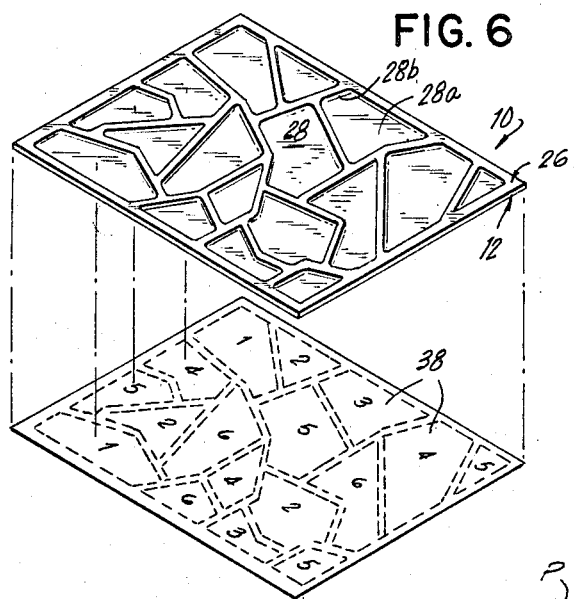
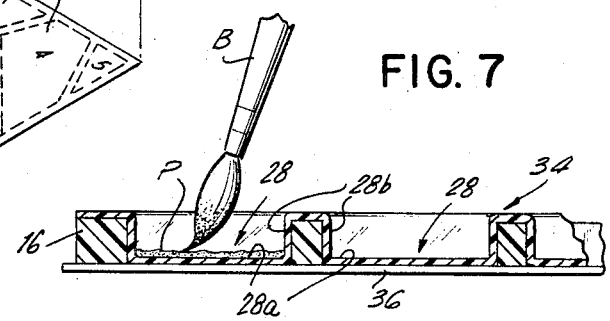
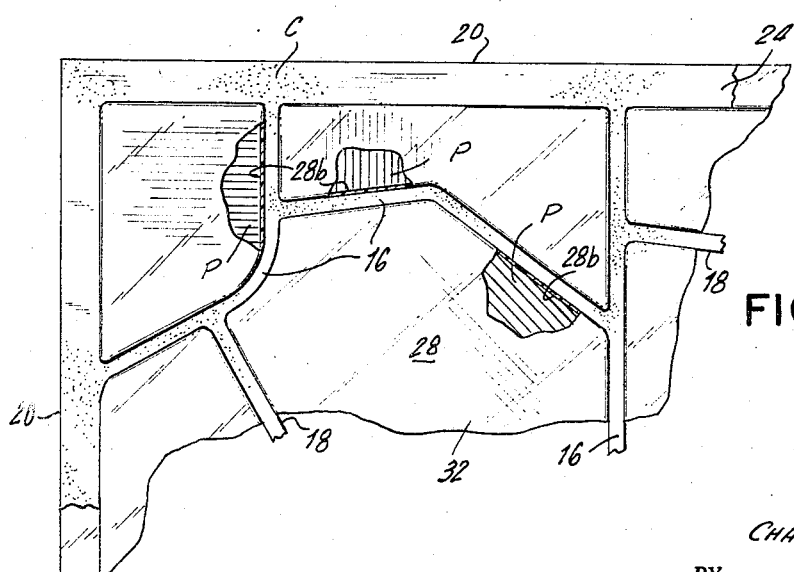

May 7, 1968 C. W. POWELL 3,382,134
SIMULATED VENETIAN GLASS AND METHOD OF MAKING THE SAME
Filed July 20, 1964 3 Sheets-Sheet 3

INVENTOR.
CHARLES W. POWELL
BY Amster & Rothstein
ATTORNEYS

United States Patent Office 3,382,134
Patented May 7, 1968

3,382,134
SIMULATED VENETIAN GLASS AND METHOD
OF MAKING THE SAME
Charles W. Powell, 232 E. 50th St.,
New York, N.Y. 10022
Filed July 20, 1964, Ser. No. 383,827
7 Claims. (Cl. 161—5)

ABSTRACT OF THE DISCLOSURE

A simulated Venetian glass product. A sheet of transparent material is embossed onto a lead-simulating frame, with the sheet extending forwardly into the openings from the rear of the frame. Coloring material is deposited on the rear face of the sheet at each of the glass-simulating areas. A highly authentic Venetian glass product is achieved by fabricating the transparent sheet with an irregular surface, and by attaching a translucent paper backing sheet to the assembly.

The present invention relates to Venetian glass art and in particular to an improved method for the manufacture of simulated Venetian glass art and to an improved Venetian glass product.

Simulated glass art work is known which includes a transparent sheet having a series of embossed regions which are shaped to simulate individual glass of Venetian glass. This type of art work has been fabricated through coloring the embossed regions by painting the rearwardly facing depressions thereof. Quite obviously, this construction requires the formation of mortar lines either prior to or subsequent to the painting of the embossed regions. The painting of mortar lines involves a very difficult operation, due to the close proximity of the mortar lines to the embossed areas and the different colors of paints used in these respective areas.

Another approach to this problem has been the provision of a colored backing sheet on which the rearward face of the transparent sheet is mounted such that the coloring of the backing sheet is visible through the unpainted regions of the transparent sheet.

These prior attempts to provide some type of simulated mortar lines have not been completely successful, and it would be advantageous to provide an easier method of obtaining a product which more closely resembles thick, chunky, solid glass, set in lead.

Broadly, it is an object of the present invention to provide an improved Venetian glass construction and method of manufacture which obviates one or more of the aforesaid disadvantages. Specifically, it is within the contemplation of the present invention to provide Venetian glass art which is fabricated from a sheet of transparent material which is molded onto a backing section. It is also intended to provide a paper backing sheet for simulating framed Venetian art work.

Advantageously, the present invention provides an improved product and method for the creation of simulated Venetian glass art of prescribed designs.

It is a further object of the present invention to provide a method for creating simulated Venetian glass art which closely approaches the appearance of Venetian glass made of real glass set in lead.

Another object of the invention is to provide framed Venetian art work that can be positioned behind lamps such that an appearance is achieved which exactly resembles Venetian stain glass.

In accordance with the method aspects of the present invention, simulated Venetian glass may be created by forming a grout-simulating frame having a plurality of openings and having grout-simulating border areas between said openings and about the periphery of said frame. A sheet of transparent material is embossed onto the frame with the sheet extending forwardly into the opening from the rear of the frame and forming individual glass-simulating areas in each of the openings. Then, transparent coloring material can be deposited on the rear face of the sheet at each of the glass-simulating areas.

The simulated assembly demonstrating objects and features of the present invention comprises a lead-simulating frame having a plurality of openings formed therein of the shape of the individual sections of glass to be simulated. Lead-simulating border areas having the appearance of lead material are disposed between the openings and about the periphery of the frame. A glass-simulating sheet is embossed about the frame with the sheet extending forwardly into the openings from the rear of the frame and forming individual glass-simulating areas in each of the openings. The rear face of the sheet at each of the glass-simulating areas has color material placed thereon.

The above brief description as well as further objects and advantages of the present invention will be best appreciated by reference to the following detailed description of a presently preferred simulated Venetian glass art, and method for its manufacture, when taken in conjunction with the accompanying drawings, wherein:

FIG. 6 is an exploded perspective view showing the molded transparent sheet and frame section positioned for assembly with a color coded instruction sheet;

FIG. 7 is an enlarged fragmentary sectional view of the transparent sheet and frame section mounted on the color coded instruction sheet;

FIG. 8 is a fragmentary plan view of the front face of the completed Venetian glass art;

Figure 1:
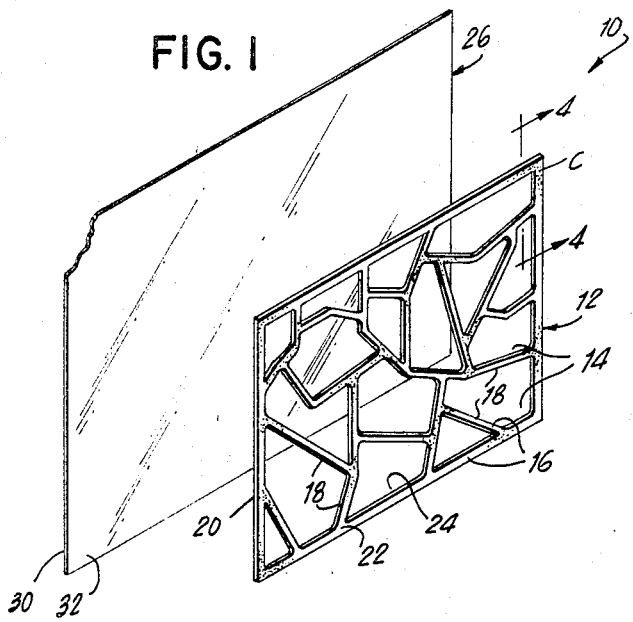
FIG. 1 is an exploded perspective view showing a transparent sheet positioned for molding onto a frame which ultimately will make up the Venetian glass art.

Referring now specifically to the drawings there is shown the constructional details and method for the preparation of a simulated Venetian glass 10 in accordance with an illustrative embodiment of the present invention. Specifically, the simulated Venetian glass includes a lead-simulating frame section 12 having a plurality of openings 14 formed therein of the shape of the individual sections of the Venetian glass to be simulated. Conveniently, the frame section 12 can be formed from any transparent rigid material which can easily be molded or shaped into a pattern of glass-like configuration such as is shown in FIG. 1. It is preferable to mold the frame 12 from a thermoplastic material having a coloring medium C thereby obtaining in one operation the frame 12 which has the appearance of contrasting simulated lead, or to fabricate the frame 12 from die cut board. The frame section 12 is in the form of lead-simulating border areas 16 between the openings 14 and about the periphery of the frame section. The border areas 16 include inner side walls 18 which border each of the openings 14, outer side walls 20 which extend around the periphery of frame section 12 and relative flat rear and front faces 22, 24.

Figure 4:
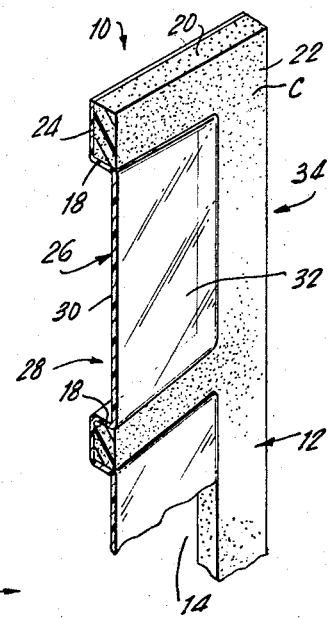
FIG. 4 is an enlarged perspective view of the assembled transparent sheet and frame section as shown in section taken substantially along the line of 4—4 of FIG. 1 and looking in the direction of the arrows.

As best seen in FIG. 4 the simulated Venetian glass 10 includes a transparent glass-simulating sheet 26 which is embossed or molded about the frame 12 with the sheet 26 extending forwardly into the openings 14 from the rear face 24 of frame 12. The sheet 26 is preferably formed of relatively thin gauge thermoplastic material. In this manner, individual glass-simulating areas or cavities 28 are formed on the rear face 30 of sheet 26 in each of the openings 14. By molding or embossing sheet 26 onto frame 12, the front face 32 of sheet 26 is coextensive with the front face 22, inner side walls 18, and openings 14 of frame 12. Accordingly, a Venetian glass sub-assembly 34 is formed with the glass-simulating areas 28 on the rear face 30 of sheet 26 being defined by a bottom wall 28a and side wall 28b. Each of the glass-simulating areas 28 can be colored in accordance with an overall pattern or scheme by inverting the Venetian glass sub-assembly 34 as shown in FIGS. 6 and 7 and by placing transparent paint or other suitable coloring medium P on bottom walls 28a of each of the cavities 28. As illustrated in FIG. 7, glass sub-assembly 34 is positioned on the instruction surface 36 for applying the transparent paint or coloring medium P over the bottom walls 28a of glass-simulating cavities 28 by means of a brush B.

Figure 9:
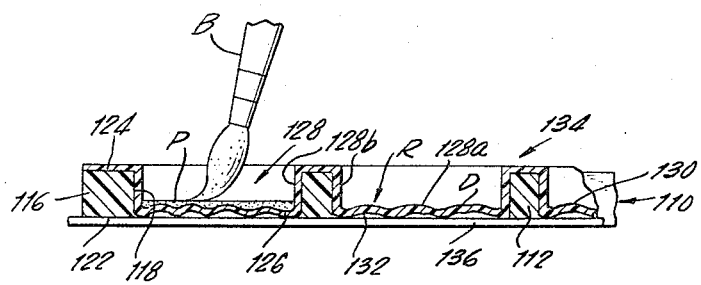
FIG. 9 is a fragmentary sectional view similar to FIG. 7 but showing a transparent sheet having a rough surface to provide an antique effect.
Figure 10:
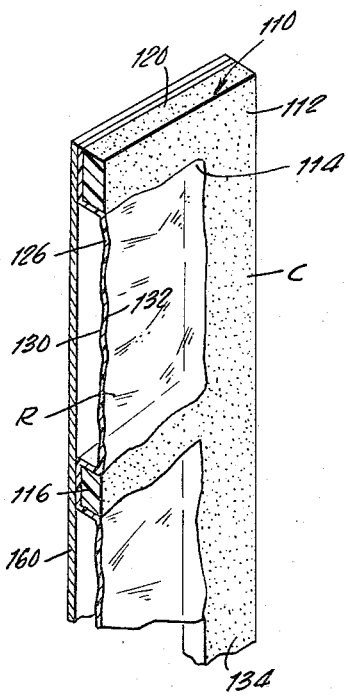
FIG. 10 is a perspective view similar to the sheet and frame section of FIG. 4, but showing the rough surface of the sheet as in FIG. 9, as well as the provision of a backing sheet for framed Venetian glass work.

In accordance with a further embodiment demonstrating objects and features of the present invention there is shown in FIGS. 9 and 10 a simulated Venetian glass 110 which incorporates means for providing an uneven distribution of paint P such that an antique effect is achieved, as will presently be described herein. Specifically, the simulated Venetian glass includes a lead-simulating frame section 112 having a plurality of openings 114 formed therein of the shape of the individual sections of the Venetian glass to be simulated. Conveniently, the frame section 112 can be formed from any transparent rigid material which can easily be molded or shaped into a pattern of glass-like configuration similar to that which is shown in FIG. 1. It is preferable to mold the frame 112 from a thermoplastic material having a coloring medium C thereby obtaining in one operation the frame 112 which has the appearance of contrasting simulated lead or alternatively to fabricate the frame 112 from die cut board. The frame section 112 is in the form of lead-simulating border areas 116 between the openings 114 and about the periphery of the frame section. The border areas 116 include inner side walls 118 which border each of the openings 114, outer side walls 120 which extend around the periphery of the frame section 112 and relative flat rear and front faces 122, 124.

The simulated Venetian glass 110 includes a transparent glass-simulating sheet 126 which is embossed or molded about the frame 112 with the sheet 126 extending forwardly into the openings 114 from the rear face 124 of frame 112. The sheet 126 is preferably formed of relatively thin gauge thermoplastic material. In this manner, individual glass-simulating areas or cavities 128 are formed on the rear face 130 of sheet 126 and each of the openings 114. By molding or embossing sheet 126 onto the frame 112 the front face 132 of sheet 126 is coextensive with the front face 122, inner side walls 118 and openings 114 or frame 112. Accordingly, a Venetian glass sub-assembly 134 is formed with the glass-simulating areas 128 on the rear face 130 of sheet 126 being defined by a bottom wall 128a and a side wall 128b. Each of the glass-simulating areas 128 can be colored in accordance with an overall pattern or scheme by inverting the Venetian glass sub-assembly 134 in a similar manner to the coloring of the Venetian glass sub-assembly 34 as shown in FIGS. 6 and 7 and previously described herein. In order to provide an uneven or relief surface R on the transparent sheet 126, the die 42 shown in FIGS. 2 and 3 can be fabricated with a corresponding uneven or irregular surface instead of the relatively flat surface previously illustrated herein. When the paint P is deposited onto the sheet 126, it flows heavily into the depressed areas D, as shown in FIG. 9. Accordingly, when the paint has dried, the resulting effect obtained is an article which is authentic in appearance to Venetian glass.

As shown in FIG. 10, the simulated Venetian glass 110 is provided with a translucent paper backing sheet 160 which is attached to the Venetian glass sub-assembly 134 by a suitable adhesive. The paper backing sheet 160 and Venetian glass sub-assembly 134 provide a simulated framed Venetian glass art 162, which is particularly useful in making lamps. The simulated framed Venetian glass art 162 is usually mounted in front of the lamp such that the backing sheet 160 is disposed in confronting relation to the source of light. The roughness or unevenness of the relief surface R causes shadows to be cast on the backing sheet 160 such that a perception of depth is obtained. Thus, the simulated framed Venetain glass 162, appears similar to thick, chunky solid glass set in lead which exactly resembles Venetian stained glass.

It will be appreciated that little skill is required for painting the glass cavities 28, 128, since the individual areas to be painted are well isolated and surrounded by the border areas 16, 116. To facilitate the coloring of the individual glass-simulating areas 28, 128, the color-coded instruction sheet 36, as best seen in FIG. 6, is provided with outlines 38 corresponding to the bottom walls 28a, 128a, which define the individual glass areas on the sheet of transparent material 26, 126. After completion of the coloring of the glass cavities 28, 128, the sub-assembly 34, 134, is inverted such that the front face 22, 122 of frame 12, 112, has the appearance of lead lines surrounding a plurality of individual glass sections. Hence, the coloring P deposited in the cavities 28, 128, together with the lead lines simulated by the frame 12, 112, approach the over-all appearance of Venetian glass which has actually been set in lead.

Figure 2:
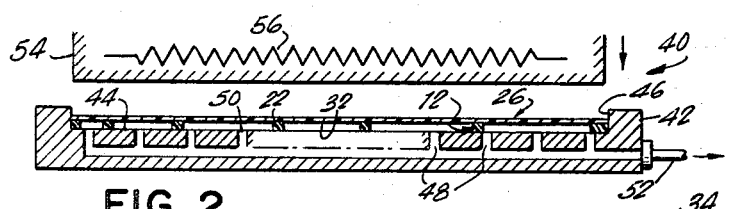
FIG. 2 is an elevational view of the sheet and frame section of FIG. 1, shown positioned in a molding apparatus.
Figure 3:
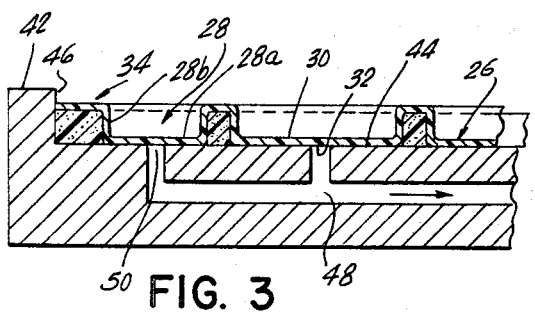
FIG. 3 is an enlarged fragmentary section of the sheet and frame section of FIG. 2, but showing the sheet after it has been embossed onto the frame section.
Figure 5:
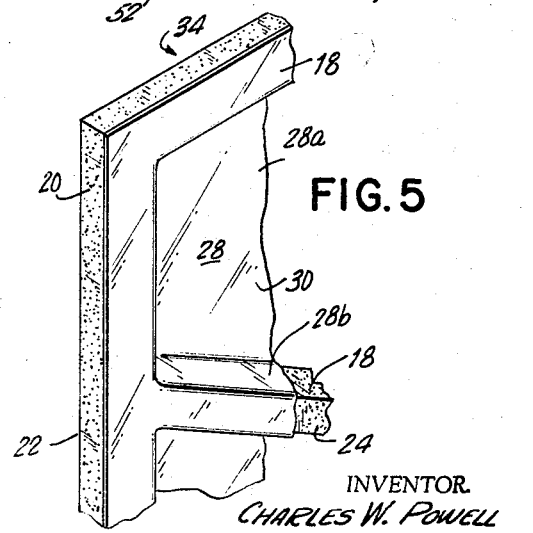
FIG. 5 is an enlarged fragmentary perspective view of the assembled Venetian glass art of FIG. 4 with portions of the transparent sheet material broken away to better show the coloring of the frame section.

In accordance with the method aspects of the instant invention, a molding apparatus 40 is provided to mold or emboss the sheet of transparent material 26 onto the frame section 12. The molding apparatus 40 includes a die 42 having a relatively flat die cavity 44 or a ragged antique glass-simulating surface which is sized to receive the frame section 12, 112 and sheet material 26, 126. As best seen in FIG. 2, the frame section 12, 112 is placed in the cavity 44 and the front face 32, 132 of sheet 26, 126 is positioned on the rear face 22, 122 of frame section 12, 112. It is preferable to provide the cavity 44 with side walls 46 of sufficient depth to extend above the rear face 30, 130 of sheet material 26, 126 when mounted in the die 42 on top of the frame section 12, 112.

For the purpose of molding or embossing the sheet of transparent material 26, 126 onto the frame section 12, 112 the die 42 is provided with a series of channels 48 leading to openings 50 in the base of die cavity 44. An exhaust pipe 52 is connected to the channels 48, and the pipe 52 is connected to any suitable means for causing a reduction of the pressure in channels 48, such as a vacuum pump or the like. The pressure reduction in channels 48 is transmitted to the die openings 50 which is synchronized with the operation of a platen press 54 of molding apparatus 40. By providing a heating means in the platen press 54, such as an electric heating coil 56, it is possible to apply heat to the rear face 30, 130 of transparent sheet 26, 126 in order to effectuate molding or embossing of the sheet 26, 126 onto the frame 12, 112. The platen press 54 is preferably shaped to fit within the cavity 44 so as to loosely contact the portions of side wall 46 extending above the plastic sheet 26, 126. In this manner, the heat imparted to the plastic sheet 18 together with the reduction of pressure or evacuation of air in the channels 48, causes effective molding or embossing of the plastic sheet onto the frame 12. Thus, by imparting heat to the plastic sheet 26, the plastic material is brought to a soft moldable condition. The suction provided by the reduction of pressure in channels 48 causes the front face 32, 132 of sheet 26, 126 to be molded and bonded onto the rear face 24, 124 and inner side walls 18, 118 of frame 12, 112. In this manner, the Venetian glass sub-assembly 34, 134 is formed with the bottom walls 28a, 128a of the glass-simulating cavities 28, 128 overlying the portions of the die cavity 44 which are coextensive with glass-shaped openings 14.

A latitude of modification, change and substitution, is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. A simulated Venetian glass art assembly comprising a lead-simulating frame having a plurality of openings formed therein of the shape of the individual glass sections to be simulated and having lead-simulating border areas between said openings and about the periphery of said frame such that said border areas have the appearance of leading material, a transparent glass-simulating sheet embossed about said frame with said sheet confronting said border areas and extending forwardly into said openings from the rear of said frame and forming individual glass-simulating areas in each of said openings, and color material on the rear face of said sheet at each of said glass-simulating areas.

2. A simulated Venetian glass assembly comprising a lead-simulating frame having a plurality of openings formed therein of the shape of the individual glass sections to be simulated and having lead-simulating border areas between said openings and about the periphery of said frame such that said border areas have the appearance of leading material, a transparent thermoplastic sheet molded about said frame with said sheet extending forwardly into said openings from the rear of said frame and forming individual glass-simulating areas in each of said openings, the rear face of said frame being formed with an uneven surface, and means on said glass-simulating areas for imparting color to said uneven surface of the rear face of said sheet such that said sheet has the appearance of Venetian glass.

3. A simulated framed Venetian glass art assembly comprising a lead-simulating frame having a plurality of openings formed therein of the shape of the individual glass sections to be simulated and having lead-simulating border areas between said openings and about the periphery of said frame such that said border areas have the appearance of leading material, a transparent glass-simulating sheet embossed about said frame with said sheet extending forwardly into said openings from the rear of said frame and forming individual glass-simulating areas in each of said openings, the portions of said sheet extending into said openings defining an uneven surface, and color material on said rear face at each of said glass-simulating areas and a paper backing sheet fixed to the portion of the rear face of said sheets which is in confronting relation to said border areas such that an appearance is obtained resembling thick, chunky, solid Venetian glass set in lead.

4. A method of creating a simulated Venetian glass assembly including the steps of forming a lead-simulating frame having a plurality of openings formed therein and having lead-simulating border areas between said openings and about the periphery of said frame, embossing a sheet of transparent glass-simulating material onto said frame with said sheet extending forwardly into said openings from the rear of said frame and forming individual glass-simulating areas in each of said openings with each of said glass-simulating areas having an irregular surface and depositing liquid color material on the rear face of said sheet at each of said glass-simulating areas such that said color material flows unevenly onto said irregular surface.

5. A method of creating a Venetian glass assembly including the steps of forming a lead-simulating frame having a plurality of openings formed therein and having lead-simulating border areas between said openings and about the periphery of said frame, embossing a sheet of transparent glass-simulating material onto said frame with said sheet-extending forwardly into said openings from the rear of said frame and forming individual tile simulating areas in each of said openings, mounting the embossed sheet and frame section over a color coded instruction sheet having glass outlines which register with said glass-simulating areas and painting the rear faces of said glass-simulating areas in accordance with the color coding of said instruction sheet.

6. A method of creating a simulated Venetian glass assembly comprising the steps of forming a lead-simulating frame with a plurality of openings therein of the shape of individual glass areas of the Venetian to be simulated with lead-simulating border areas between said openings and about the periphery of said frame, placing said frame section in the cavity of a molding die having a top face which is irregular and with the front face of said frame overlying said top face, positioning the rear face of a sheet of transparent material under a heated molding platen which overlies said molding die, moving said platen downwardly to a position coextensive with said die cavity such that the front face of said sheet is coextensive with the rear face of said frame section, evacuating the air from said die cavity to emboss the front face of said sheet onto the rear face of said frame with said front face of said sheet extending forwardly into said openings from the rear face of said frame to form individual glass-simulating areas on the rear face of said sheet in each of said openings, and depositing a coloring medium on the rear face of said sheet in each of said glass-simulating areas.

7. A method of creating a simulated framed Venetian glass assembly including the steps of forming a lead-simulating frame having a plurality of openings formed therein and having lead-simulating border areas between said openings and about the periphery of said frame, embossing a sheet of transparent glass-simulating material onto said frame with said sheet extending forwardly into said openings from the rear of said frame and forming individual glass-simulating areas in each of said openings with each of said glass-simulating areas having an irregular surface, depositing liquid color material on the rear face of said sheet at each of said glass-simulating areas such that said color material flows unevenly onto said irregular surface, and fixing a paper backing sheet to the rear face of the embossed transparent glass-simulating material such that an appearance is obtained resembling thick, chunky, solid Venetian glass set in lead.

References Cited

UNITED STATES PATENTS

| | | | |
|---|---|---|---|
| 272,032 | 2/1883 | Edge. | |
| 2,095,402 | 10/1937 | Stark | 161—5 |
| 2,876,574 | 3/1959 | Powell | 161—5 |
| 2,982,042 | 5/1961 | Gick | 161—5 |
| 3,130,101 | 4/1964 | Gittins et al. | 156—163 |
| 3,177,279 | 4/1965 | Bilodeau | 264—255 |
| 3,238,031 | 3/1966 | Nikoll | 65—94 |
| 3,287,193 | 11/1966 | Klein | 156—59 |

ROBERT F. BURNETT, *Primary Examiner.*

ALEXANDER WYMAN, *Examiner.*

W. POWELL, *Assistant Examiner.*